United States Patent [19]
Lewis

[11] 3,902,025
[45] Aug. 26, 1975

[54] PORTABLE TELEPHONE APPARATUS

[76] Inventor: Minnie B. Lewis, 5423 S. Harper, Chicago, Ill. 60615

[22] Filed: Jan. 14, 1974

[21] Appl. No.: 433,246

[52] U.S. Cl. ................ 179/157; 179/147; 179/153; 179/156 R; DIG. 26/14 A
[51] Int. Cl. ............................................. H04m 1/04
[58] Field of Search ................. DIG. 26/14 R, 14 A; 179/157, 156 R, 146 R, 147, 153

[56] References Cited

UNITED STATES PATENTS

| | | | |
|---|---|---|---|
| 922,001 | 5/1909 | Koehler | 179/157 |
| 1,304,718 | 5/1919 | Townsend | 179/157 |
| 3,347,998 | 10/1967 | Cunningham | 179/157 |
| 3,444,329 | 10/1969 | Krumreich | 179/100 |
| 3,567,871 | 3/1971 | Walter | 179/157 |

*Primary Examiner*—Kathleen H. Claffy
*Assistant Examiner*—C. T. Bartz
*Attorney, Agent, or Firm*—Molinare, Allegretti, Newitt & Witcoff

[57] ABSTRACT

An improved portable telephone housing. The housing includes a resilient U-shaped shoulder-engaging portion rigidly secured to an upright hollow portion. The shoulder-engaging portion and the upright hollow portion define a cavity wherein the basic telephone components are secured.

3 Claims, 6 Drawing Figures

PORTABLE TELEPHONE APPARATUS

BACKGROUND OF THE INVENTION

Many jobs, particularly of a clerical nature, require the worker to communicate by telephone and, at the same time, do various manual tasks, such as filing, record searching, or note taking. These tasks, of course, require that the worker have his hands "free."

Telephone shoulder rests and handset holders are presently available. Most, however, require the user to wedge the handset-and-holder combination between his ear and shoulder. This is awkward, uncomfortable and restricts the user's freedom of movement.

In addition, it is often necessary for a worker to move away from the telephone terminal and, in these instances, it is desirable that the worker carry the entire telephone unit with him. This avoids the time-consuming task of returning to the terminal to disconnect the line or place another call. The presently known shoulder rests and handset holders, mentioned earlier, are clearly inadequate in this regard.

SUMMARY OF THE INVENTION

It is thus an object of the present invention to provide an improved portable telephone unit which may be readily secured to the shoulder of a user.

It is a further object of the present invention to provide an improved telephone unit wherein all of the basic telephone components are secured within a portable housing.

It is also an object of the present invention to provide an improved portable telephone unit which is lightweight, durable, and easily manufactured.

These and other objects which will become apparent in the detailed description which follows are accomplished by an improved telephone housing comprising a substantially U-shaped, shoulder-engaging portion and a substantially upright hollow portion. The shoulder-engaging portion includes a pair of downwardly-extending stabilizing members and is rigidly secured to said upright hollow portion. The shoulder-engaging portion and the upright hollow portion cooperate to define a cavity wherein the basic telephone components, i.e., a receiver, transmitter, dial, ringer and disconnect, are secured.

BRIEF DESCRIPTION OF THE DRAWING

In the following detailed description of the present invention, reference will be made to the drawing wherein.

DETAILED DESCRIPTION OF THE PREFERRED EMBODIMENTS

Figure 1:
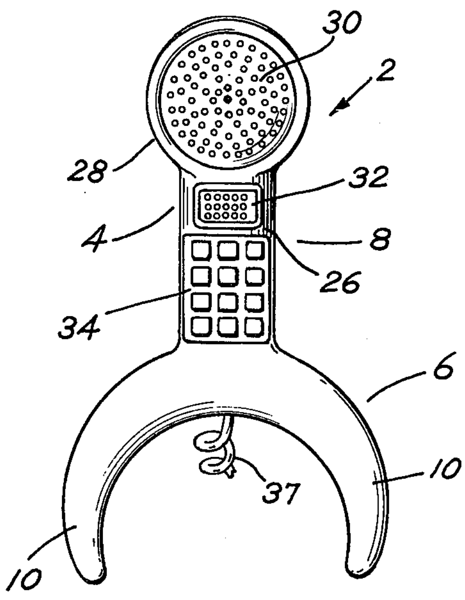
FIG. 1 is a front view of a preferred embodiment of the present invention.

Referring to FIGS. 1–6, a preferred embodiment of the present invention is shown as a portable telephone unit 2. The unit 2 comprises a housing 4 which has a shoulder-engaging portion 6 and a substantially hollow upright portion 8.

The shoulder-engaging portion 6 is a molded part of flexible, resilient plastic, such as polypropylene or polyethylene. The shoulder-engaging portion 6 is U-shaped and includes a pair of downwardly extending stabilizing members 10. The shoulder-engaging portion 6 is rigidly attached to the upright hollow portion 8 of the housing 4, as will be described in detail below.

Figure 3:
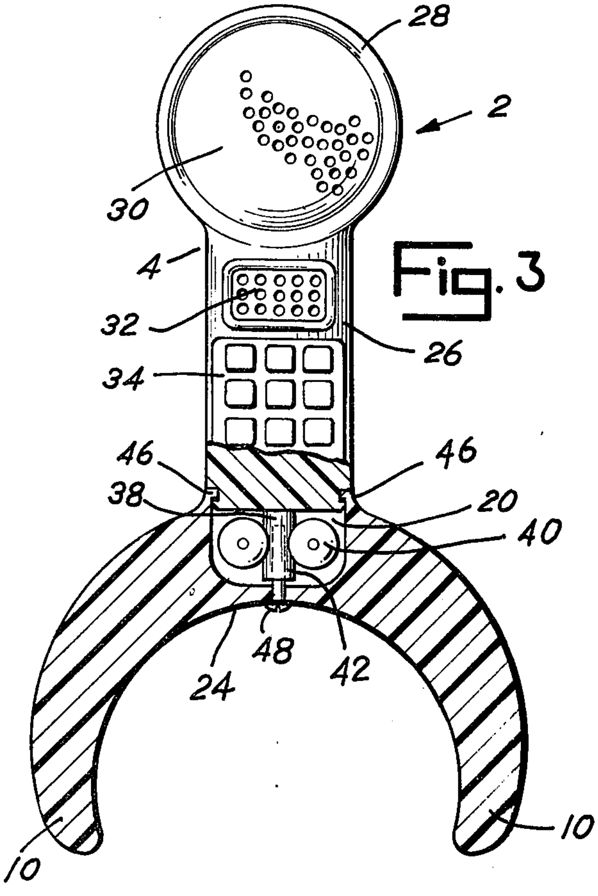
FIG. 3 is a side view of the embodiment shown in FIG. 1.

The upright hollow portion 8 is two-pieced. As best shown in FIG. 3, the upright hollow portion 8 includes a first half member 12, defining a front surface 14, and a second half member 16 defining a back surface 18. The first and second half members 12, 16, include interior partitions, not shown.

Figure 2:
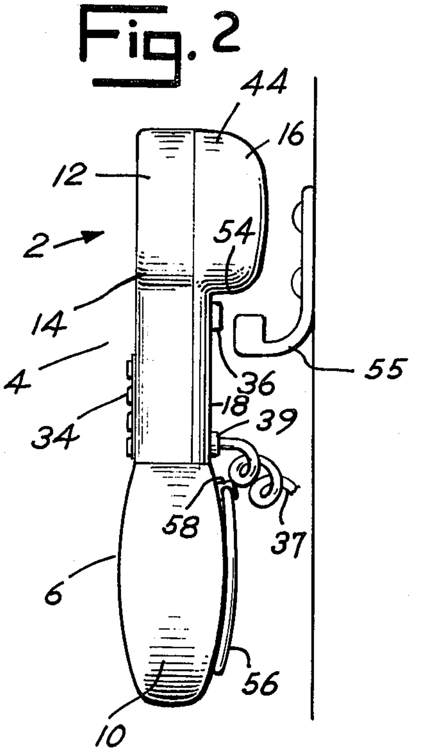
FIG. 2 is a partial cut-away front view of the embodiment shown in FIG. 1.

As shown in the cut-away portion of FIG. 2, the shoulder-engaging portion 6 and the upright hollow portion 8 cooperate to define a cavity generally designated 20, where the basic telephone components are secured by conventional means and with the aid of the interior partitions of the first and second half members 12, 16. An aperture or opening 22 connects the cavity 20 with a shoulder-engaging surface 24 of the shoulder-engaging portion 6.

In this preferred embodiment, the upright hollow portion 8 also includes a neck section 26 and a bulbous section 28, opposite the shoulder-engaging portion 6. As shown in FIGS. 1, 2, and 3, a receiver 30 is secured within the bulbous section 28, and a transmitter 32, dial 34, and disconnect button 36 are secured within the neck section 26 of the upright hollow portion 8.

Again referring to the cut-away portion of FIG. 2, a post 38 extends downwardly from the dial 34. The post 38 supports a ringer 40. The end 42 of the post 38 is internally threaded.

A network (not shown) interconnects the receiver 30, transmitter 32, dial 34, disconnect button 36 and ringer 40. The network is connected to a telephone line (not shown) by a cord 37. The cord 37 passes through a grommet 39 in the back surface 18 of the second half member 16.

In the assembled state, the first and second half members 12, 16 of the upright hollow portion 8 are connected at the top 44 by a hinge (not shown). The upright hollow portion 8 "snaps" into the shoulder-engaging portion 6. This is accomplished by means of interlocking lips, generally designated 46, on the upright hollow portion 8 and shoulder-engaging portion 6. The ringer 40, in the assembled state, fits within the portion of the cavity 20 defined by the shoulder-engaging portion 6. The post 38 aligns with the aperture 22 and receives a screw 48, thereby rigidly securing the upright hollow portion 8 and shoulder-engaging portion 6 together. The first and second half members 12, 16 permit quick and easy assembly of the upright hollow portion 8 and telephone components 30, 32, 34, 36, 40.

As shown in FIG. 3, the bulbous section 28 of the upright hollow portion 8 includes, or defines, a lip generally designated 54. The lip 54 permits the unit 2 to be hung on a wall-mounted hook 55.

Referring now to FIGS. 3–6, the unit 2 also includes a flexible clamp member 56 secured to the back surface 18 of the housing 14 by a hinge 58. The hinge 58 is located near the junction of the shoulder-engaging portion 6 and upright hollow portion 8. The flexible clamp member 56 is a resilient plastic or metal material. The clamp member 56 is U-shaped and includes a pair of arms 60. As shown, the arms 60 substantially align with the stabilizing members 10.

Figure 4:
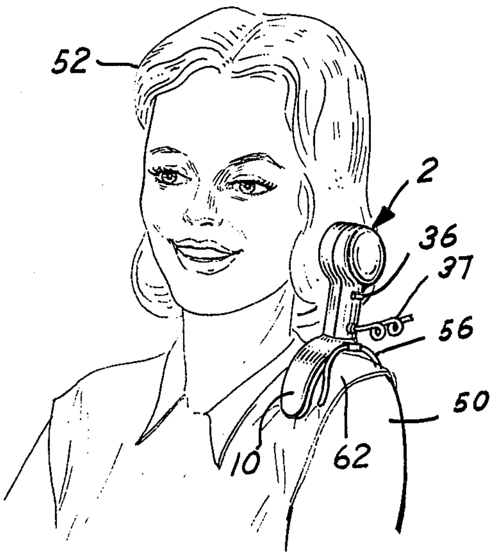
FIG. 4 is a perspective view of the embodiment shown in FIG. 1 secured to the shoulder of a user.
Figure 5:
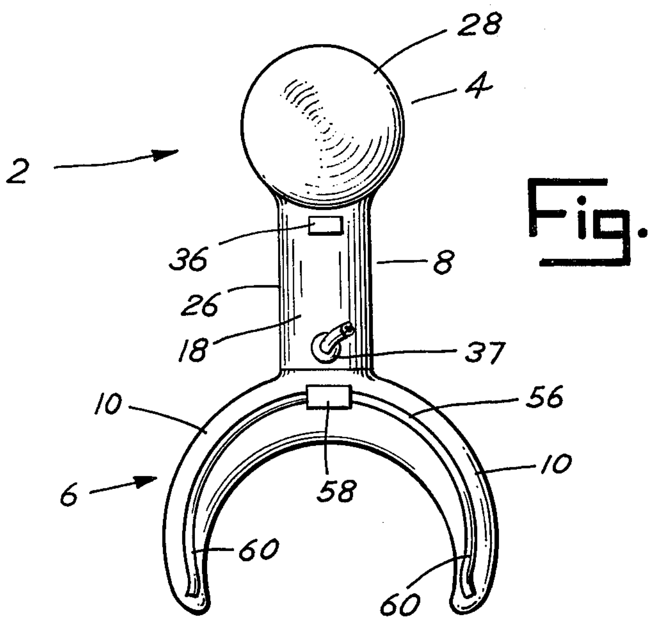
FIG. 5 is a back view of the embodiment shown in FIG. 1.

As last shown in FIG. 4, the stabilizing members 10 cooperate with the flexible clamp member 56 to define means, generally designated 62, for supporting and securing the portable telephone unit 2 upon the shoulder 50 of a user 52. More specifically, the resilient stabilizing members 10, separated for positioning of the portable telephone unit 2, exert a pressure upon or "pinch" the shoulder 50 of the user 52. The flexible clamp member 56 provides additional "pinching" action and a "tripod" configuration. That is, the clamp member 56 is aligned at an angle with respect to the portable telephone unit 2 to significantly improve the security and stability of the unit 2.

Figure 6:
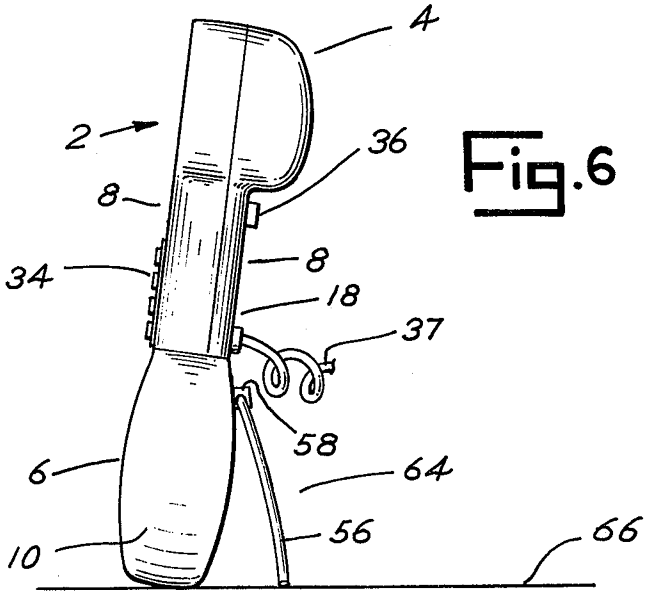
FIG. 6 is a side view of the embodiment shown in FIG. 1 standing in an upright position on a flat surface.

In addition, as shown in FIG. 6, the clamp member 56 and stabilizing members 59 permit the portable telephone unit 2 to be stood upright. The stabilizing members 10 and the clamp member 56, when aligned at an angle with respect to the unit 2, cooperate to define "tripod" means, generally designated 64, to support the unit 2 in an upright position during use or non-use. Thus, the unit 2 may be conveniently and attractively placed upon any flat surface 6.

A preferred embodiment of the present invention has been described in detail. It should be understood, however, that a variety of modifications can be made without departing from the true spirit and scope of the present invention as defined in the claims. The particular arrangement of the basic telephone components within the housing 4, for example, could be varied. The upright hollow portion 8 and the shoulder-engaging portion 6 could be appropriately threaded for screwing these portions together. The flexible clamp member 56 could also be eliminated. In this embodiment, the resilient stabilizing members 10 alone would provide the "pinching" force necessary to maintain the unit 2 on the shoulder 50 of the user 52. Removal of the flexible clamp member 62 would, of course, sacrifice standing means 64.

In addition, the shoulder-engaging portion 6 and stabilizing members 10 could be non-resilient. The "pinching" action would be provided by the flexible clamp member 56 and the shoulder-engaging portion 6 would support and stabilize the unit 2 on the shoulder 50 of the user 52.

What I claim is:

1. In a portable telephone unit having a receiver, transmitter, dial, ringer and disconnect, an improved housing comprising in combination:

a substantially U-shaped, shoulder-engaging portion including a pair of downwardly extending stabilizing members;

a substantially upright hollow portion rigidly secured to said U-shaped, shoulder-engaging portion including a first half member and a second half member, said shoulder-engaging portion and said substantially upright hollow portion cooperating to define a cavity wherein said receiver, transmitter, dial, ringer, and disconnect are secured; and means for standing said improved housing in an upright position on a flat surface, said standing means including a U-shaped clamp member having arms hingedly secured to said improved housing near the junction of said shoulder-engaging portion and said upright hollow portion, said arms substantially aligning with said downwardly extending stabilizing members, said downwardly extending stabilizing members and said U-shaped clamp cooperating to define tripod means.

2. An improved housing as claimed in claim 1 wherein said downwardly extending stabilizing members are resilient for maintaining said improved housing on the shoulder of a user.

3. An improved housing as claimed in claim 1 wherein said arms of said U-shaped clamp member are flexible, said downwardly extending stabilizing members and said flexible clamp cooperating to define means for supporting and securing said improved housing on the shoulder of a user.

* * * * *